United States Patent [19]

Cummings

[11] Patent Number: 5,502,291

[45] Date of Patent: Mar. 26, 1996

[54] STUD WELDER

[75] Inventor: Gerald F. Cummings, Vancouver, Canada

[73] Assignee: Emhart Inc., Newark, Del.

[21] Appl. No.: 335,551

[22] Filed: Nov. 7, 1994

[51] Int. Cl.$^6$ .................................................. B23K 9/20
[52] U.S. Cl. ............................................................. 219/98
[58] Field of Search ........................................ 219/98, 99

[56] References Cited

U.S. PATENT DOCUMENTS

| 5,030,815 | 7/1991 | Glorioso | 219/98 |
| 5,070,226 | 12/1991 | Raycher et al. | 219/98 |
| 5,252,802 | 10/1993 | Raycher | 219/98 |
| 5,321,226 | 6/1994 | Raycher | 219/98 |

FOREIGN PATENT DOCUMENTS

| 584695 | 1/1947 | United Kingdom | 219/98 |

Primary Examiner—Clifford C. Shaw

[57] ABSTRACT

A stud welder which includes a welding head having a stud receiving and retaining mechanism for holding an end of a stud towards a workpiece, a linear actuator having a fixed permanent magnet, a movable coil coupled to an acutator shaft and the actuator shaft coupled to the welding head and a controller coupled to the actuator coil and to the welding head and operative to move the actuator coil and welding head from a retracted to an extended position and back again and to cause welding current to flow into the welding head.

10 Claims, 3 Drawing Sheets

5,502,291

STUD WELDER

FIELD

The present invention relates to a stud welder used to automatically weld a stud to metal part.

BACKGROUND

Conventional stud welders use solenoids to control the back and forth movement of the welding gun from a retracted position to an operative position in which the stud is juxtaposed to a metal part to which it is to be welded. Such welders must be adjusted for each different type of weld. Since the stroke of a solenoid is inherently short, because the position of the workpiece to which welding must be accomplished varies over a range larger than the stroke of the solenoid, and because the amount which the stud "sticks out" from the welding head varies, a clutch must be used to compensate for this variation. Clutches, however, introduce additional complexity, expense and reliability problems.

The reliability of welders could be improved and their expense reduced by using an actuator with a long stroke. Typically, a suitably long stroke would be about 10 mm. Such a stroke would allow the elimination of a clutch.

U.S. Pat. No. 5,252,802 issued to Raycher and its continuation which issued as U.S. Pat. No. 5,321,226, also to Raycher, both disclose a stud welder with a linear actuator that employs position control. The actuator utilizes a movable permanent magnet around which is wound a fixed coil formed of two sets of opposed windings. The large mass of the permanent magnet limits its acceleration and deceleration and, therefore, limits its response. Although the total weld time is long compared to the time for the actuator to move from one position to the next, the latter time is still significant and shortening it can improve productivity.

Accordingly, it is an object of the invention to provide an improved stud welder. It is a further object of the invention to provide a stud welder that is capable of faster operation than hitherto known welders.

SUMMARY OF THE INVENTION

According to the invention there is provided a stud welder having a welding head with a stud receiving and retaining mechanism for holding an end of a stud towards a workpiece. The welder includes a linear actuator having a fixed permanent magnet, a movable coil, and an acutator shaft coupled to the movable coil. The actuator shaft is coupled to the welding head. A controller is coupled to the actuator coil and to the welding head and is operative to move the actuator coil and welding head from a retracted to an extended position and back again. A host computer coupled to the controller causes welding current to flow into the welding head. By using a movable coil rather than moving the permanent magnet a much lower mass is required to be moved and so a corresponding higher rate of acceleration and deceleration may be obtained. Moveover, by using such an arrangement it is possible to achieve strokes of up to 10 mm.

Preferably the permanent magnet is a rare earth material. Samarium cobalt or neodymium boron iron are examples of suitable rare earth materials which produce a much higher magnetic field in the presence of a given magnetizing force than do conventional materials.

The coil may move with a speed of up to 800 millimeters/ second and the stroke of said coil is greater than 5 mm. A long stroke is important as it allows compensation for the variation in distance to the workpiece caused by the variation in position of the robotic arm from the workpiece and the variation in the amount that the end of a stud "sticks out" from the welding head.

The welder may include a linear encoder for monitoring the position of the actuator shaft.

A position detector may be mounted adjacent welding head to detect the presence of a workpiece.

The actuator shaft may be supported at one end by a disc spring.

BRIEF DESCRIPTION OF THE DRAWINGS

The novel features believed characteristic of the invention are set forth in the appended claims. The invention itself, however, as well as other features and advantages thereof, will be best understood by reference to the description which follows read in conjunction with the accompanying drawings wherein:

DETAILED DESCRIPTION WITH REFERENCE TO THE DRAWINGS

Figure 1:
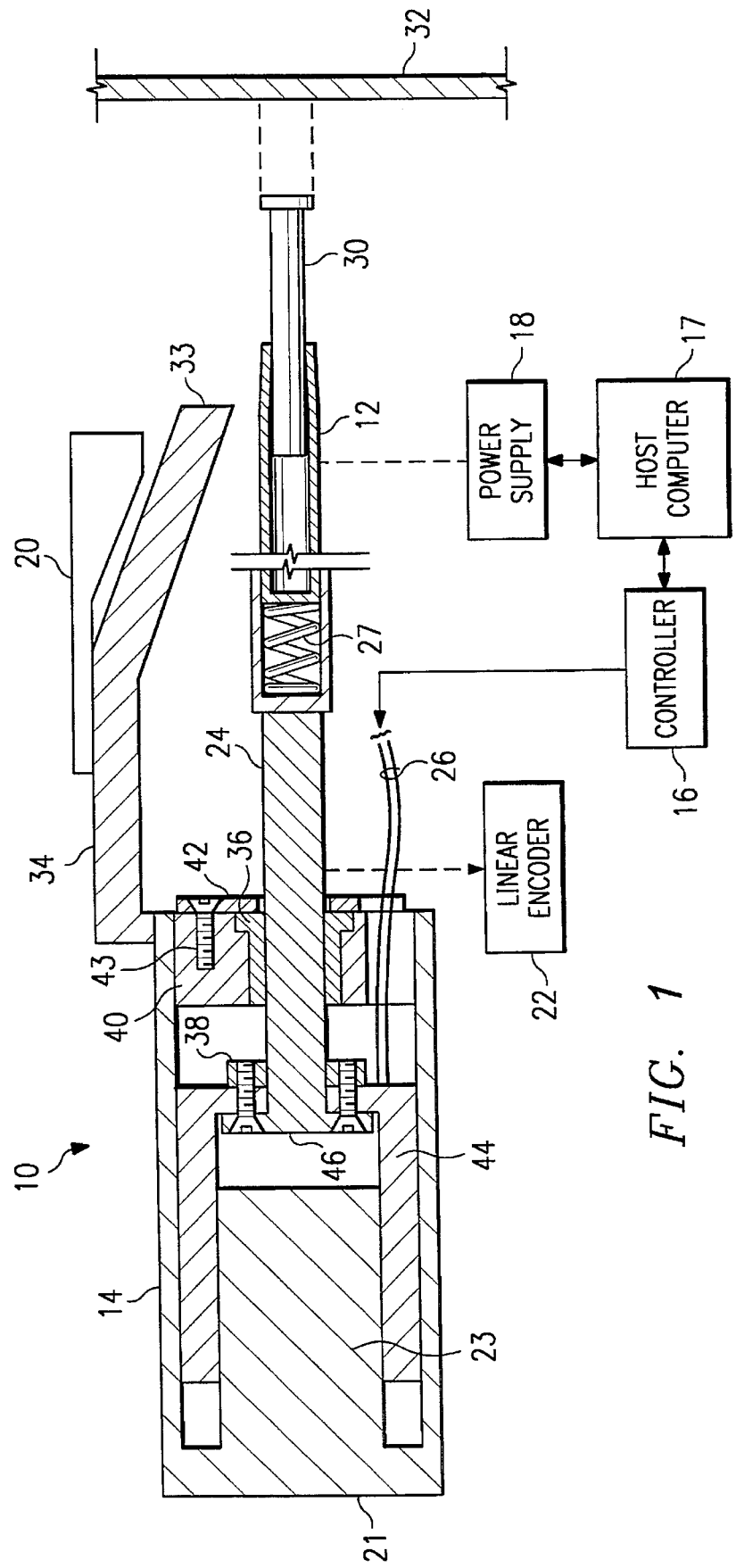
FIG. 1 is a cross-sectional view of the stud welder actuator showing it in relation to the workpiece.

Referring to FIG. 1 there is shown in cross section a stud welder 10 made up of an actuator 14, a welding gun head 12 and a linear encoder 22. The actuator 14 has a fixed permanent magnet 21 with a cylindrical inner portion 23 surrounded by a movable coil 44. The material of the permanent magnet is samarium cobalt or neodymium boron iron which provides a relatively large magnetic field in response to a given magnetizing force in comparison to conventional materials. To an end of the coil 44 is affixed an actuator shaft 24 having an enlarged flange 46 which is engaged to a washer 38 by screws so as to form a rigid coupling to coil 44. Shaft 24 passes through a bushing 36 which is retained by washer 42 and screws 43 threadedly received by end cap 40. Bushing 36 is made of Frelon and has been found to withstand the large number of abrasive particulates and ions that are present in a welding environment and cause most known materials to fail in a very short time. Frelon provides an unexpectedly low friction with shaft 24 and to have an unexpectedly long life even in the extremely adverse environment of a welding gun.

A controller 16 is coupled to coil leads 26 and controls the current supplied to the coil 44. Controller 16 is also connected to a host computer 17 which controls the power supplied by power supply 18 to welding head 12. A stud 30 is loaded in the end of welding head 12 in a known manner. The welding head 12 is spring biased by spring 27 which allows head 12 to move inwardly relative to actuator shaft 24. A position locator 33 is mounted by a bracket 34 to actuator 14 and is positioned proximate the welding head 12 so as to stop the welding head 12 from further compression against spring 27 and from further retraction when stud 30 contacts the workpiece 32. Locator 33 therefor provides a datum point for movement of actuator shaft 24. Controller receives information as to the position of the actuator shaft 24 from a linear encoder 22. A position sensor 20 gives the host computer 17 a signal to indicate that the workpiece 32 is in position. The host computer 17 informs the controller 16 of this and supplies controlled amounts of current to the actuator coil 44 so that it follows a desired graph of displacement versus time.

Figure 2:
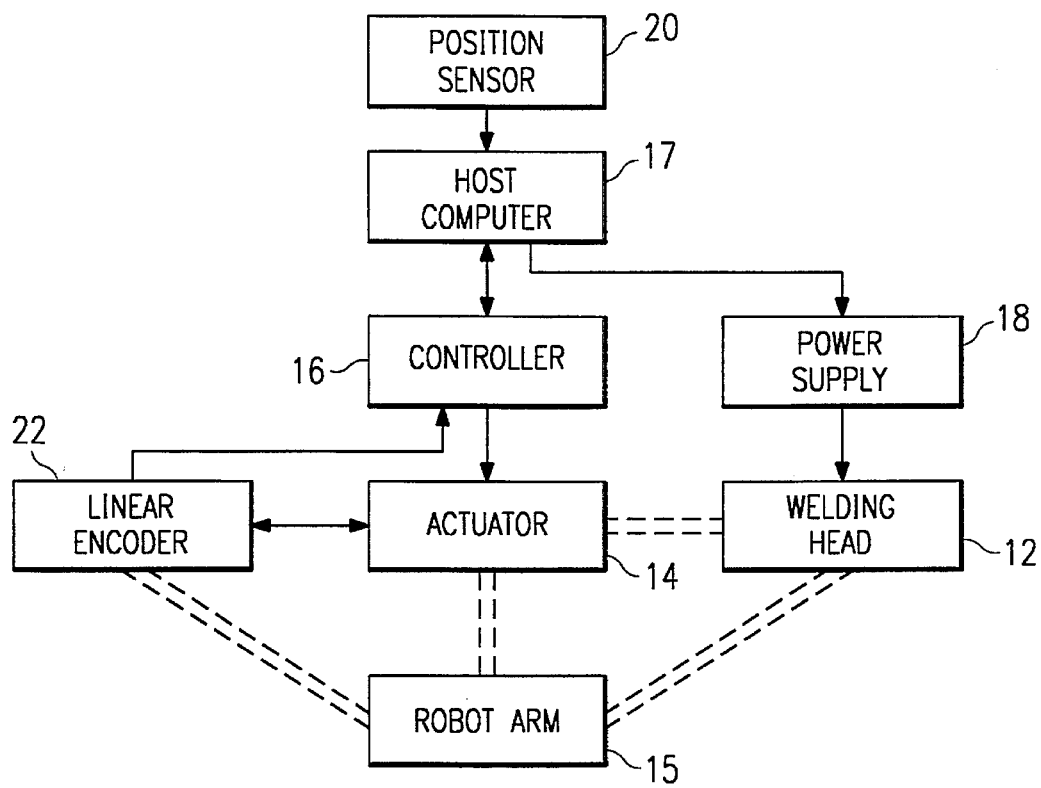
FIG. 2 is a schematic block diagram of the control circuit for the welder.

Referring to FIG. 2 the control system for the actuator 14 includes controller 16 coupled to a host computer 17. The controller 16 controls the current to the actuator 14 and hence its position and speed. A linear encoder 22 monitors the position of an actuator shaft 24 and sends this information to the controller 16. Welding head 12 is affixed to the actuator shaft 24 and is operated by a power supply 18 which, in turn, is coupled to and controlled by the host computer 17. Position sensor 20, mounted near the welding head 12, detects the presence of the workpiece 32. The actuator 14, welding head 12, linear encoder 22 and position sensor 20 are all mounted on a robotic arm 15 that moves the welder 10 from one welding location to another.

Figure 3:
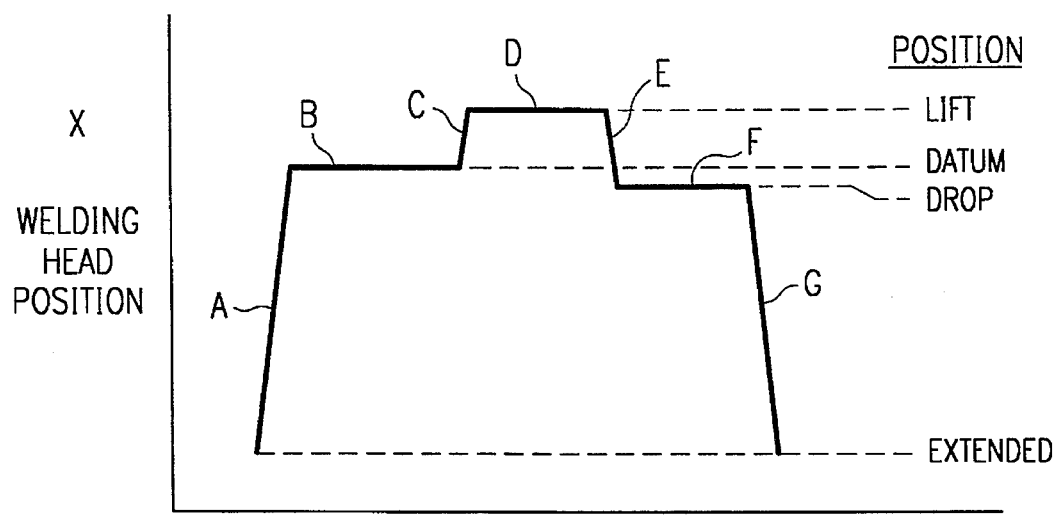
FIG. 3 is graph of the stud position as a function of time.

Referring to FIG. 3 there is shown a graph of the position of stud 30 as a function of time. It will be seen that the welder 10, which is mounted on robotic arm 15 (see FIG. 2), is in its extended position a few millimeters from workpiece 32, it is moved along line A to line B corresponding to the datum point where it contacts the workpiece 32 and is in the welding position. The controller 16 then becomes active and causes the welding head 12 to move along line C to line D corresponding to a "lift" position in which the stud is pulled away from the workpiece 32 a slight amount. At this time the host computer 17 causes a current to pass through the welding head 12 to the stud 30 and the workpiece 32 of sufficient magnitude so as to strike an arc. The arc is maintained until the metal at the end of the stud 30 and that of the workpiece 32 adjacent the stud 30 is melted. Once the latter condition is reached, the stud 30 is moved along line E to line F which corresponds to a "drop" position. The stud 30 is held in the "drop" position until the metal of the stud 30 fuses with that of the workpiece 32. The welded stud 30 is released and the robotic arm 15 moves the welder 10 to a new weld location on the same workpiece 32 or on a new one. A new stud 30 is inserted into the weld head 12, and the process is repeated.

Figure 4:
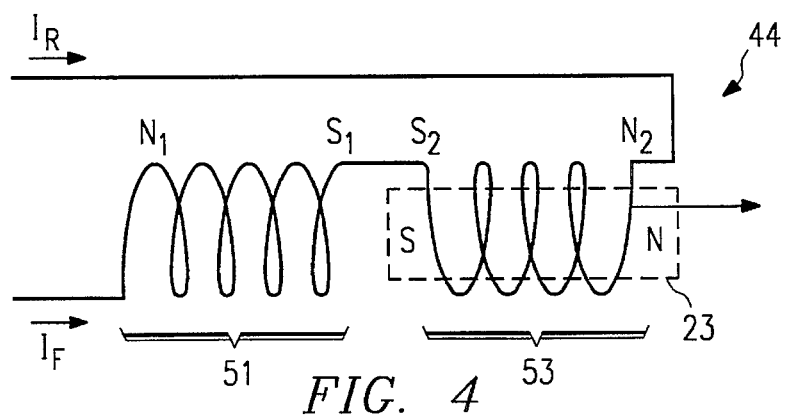
FIG. 4 is a schematic diagram of the coil windings.

Referring to FIG. 4, the winding arrangement of the coil 44 is a standard one in which one half 51 of the coil winding is toroidally wound in one direction and the other half 53 is wound in the opposite direction. With the permanent magnet 23 as shown and a current $I_F$ flowing, coil half 53 develops a north pole $N_2$ which opposes the north pole N of the permanent magnet 23 and coil half 51 develops a north pole $N_1$ which is attracted to the south pole of the permanent magnet 23. The combination of the repulsion of the north pole $N_2$ and the north pole of the permanent magnet N and the attraction of the north pole $N_1$ and the south pole S of the permanent magnet causes the coil to move in the direction of the arrow. As the coil 44 moves to the right, the north pole $N_1$ attracts the south pole S of the permanent magnet and the coil continues to move until its north pole $N_1$ aligns with the south pole of the permanent magnet. Reversing the current so that $I_R$ flows rather than $I_F$, causes the coil to move in the reverse direction.

Figure 5:
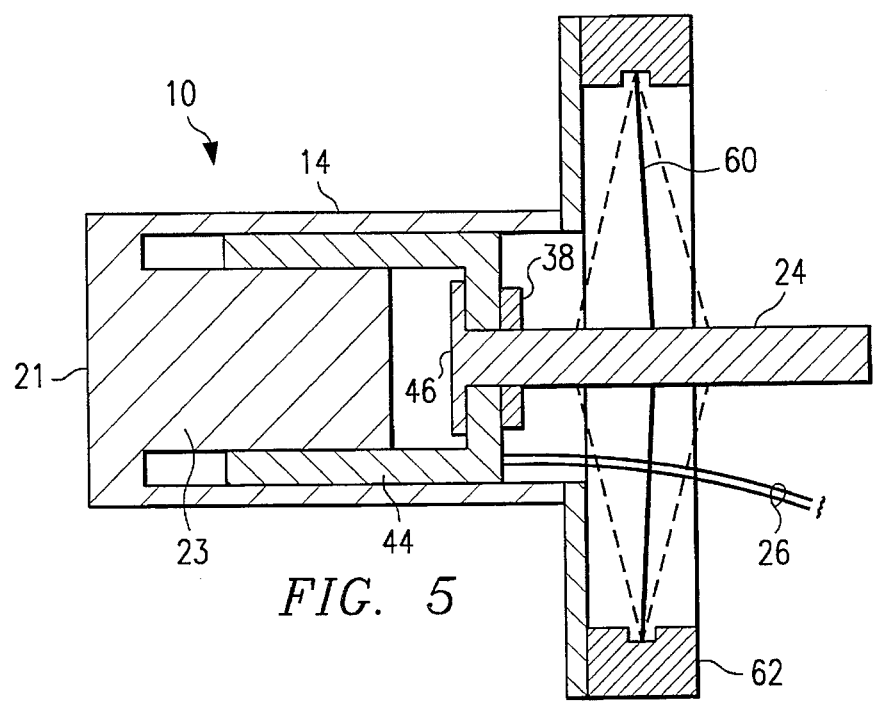
FIG. 5 is a sectional elevation view of the actuator with a disc spring in place of a bushing.
Figure 6:
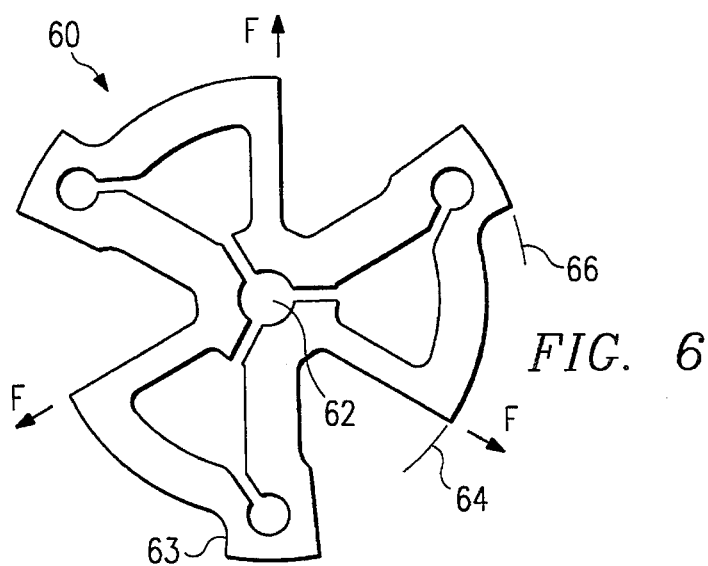
FIG. 6 is a front view of the disc spring.

Referring to FIGS. 5 and 6 there is shown an alternative to bushing 36, namely, a disc spring 60 which is described more fully in U.S. Pat. Nos. 4,822,959 and 5,269,499.

In FIG. 5, like numbers refer to like parts as in FIGS. 1 and 2. The disc spring 60 is composed of three bow segments of 120 degrees each. Outer bearing areas 63 are captured by a support 62 and central aperture 62 is stressed by actuator shaft 24. The amount of spring force is proportional to the interference between the shaft 24 and the aperture 62 of the disc 60. The lateral stability imparted by spring 60 to shaft 24 is sufficient to maintain stability. The longitudinal displacement of the disc 60 is 20 to 25% of the total disc diameter. Thus, a one diameter stroke requires a disc having a diameter of about 4 cm. Because there is no relative movement of the actuator 24 and disc spring 60, the spring is unaffected by the abrasive particles incidental to the welding operation.

Utilizing a moving coil rather than a movable permanent magnet and selecting the magnet material to be a rare earth material such as samarium cobalt or neodymium boron iron, one can achieve speeds of up to 800 millimeters/second and coil strokes of over 5 mm. Coil strokes of up to 10 mm have been achieved. Such long strokes allow the position of the actuator to be adjusted to compensate for the variation in distance to the workpiece from the end of a stud. Faster response and more accurate position control of the coil are achieved by using a moving coil which has a much lower mass than the permanent magnet. Moreover, the tendency of moving permanent magnets to pull towards one side due to its attraction to nearby metal, known as off-axis side loading, results in excessive wear on the bearings and premature failure. Such an effect is avoided by using a moving coil.

Another advantage of the moving coil is the avoidance of the hysteresis present in moving permanent magnet actuators. Since the permanent magnet is surrounded by steel parts the amount of current required to move the permanent magnet at a given position will depend upon whether it is moving from the left or the right. No such effect can occur with a moving coil. Thus, the moving coil system allows for simpler and more accurate position control than does a moving permanent magnet and fixed coil system.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

We claim:

1. A stud welder comprising:
   (a) a welding head having a stud receiving and retaining mechanism for holding an end of a stud towards a workpiece;
   (b) a linear actuator having a fixed permanent magnet, a movable coil coupled to an acutator shaft and said actuator shaft coupled to said welding head; and
   (c) a controller coupled to said actuator coil and to said welding head and operative to move said actuator coil and welding head from a retracted to an extended position and back again and to cause welding current to flow into said welding head.

2. A stud welder according to claim 1, wherein said permanent magnet is a rare earth material.

3. A stud welder according to claim 1, wherein said permanent magnet is selected from the group consisting of samarium cobalt and neodymium boron iron.

4. A stud welder according to claim 1, wherein said coil moves with a speed of up to 800 millimeters/second.

5. A stud welder according to claim 1, wherein the stroke of said coil is greater than 5 mm.

6. A stud welder according to claim 1, wherein said stroke is 10 mm.

7. A stud welder according to claim 1, including a linear encoder for monitoring the position of the actuator shaft.

8. A stud welder according to claim 1, including a host computer coupled to said controller and wherein said host computer and controller are programmed to control said actuator and welding head so that current into said welder is caused to flow after said welding head has positioned a stud adjacent a workpiece and said stud is quickly moved to contact the workpiece after an end of said stud has been melted.

9. A stud welder according to claim 1, wherein said actuator has a bushing made of Frelon.

10. A stud welder according to claim 1, including a disc spring having a central aperture engaging said actuator shaft and outer bearing areas locked in place by a support.

* * * * *